United States Patent
Stoila et al.

(10) Patent No.: US 10,960,627 B2
(45) Date of Patent: Mar. 30, 2021

(54) METHOD OF MAKING A TIRE

(71) Applicant: The Goodyear Tire & Rubber Company, Akron, OH (US)

(72) Inventors: George Michael Stoila, Tallmadge, OH (US); Michael James Hogan, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 641 days.

(21) Appl. No.: 15/693,581

(22) Filed: Sep. 1, 2017

(65) Prior Publication Data
US 2019/0070815 A1    Mar. 7, 2019

(51) Int. Cl.
*B29D 30/32* (2006.01)
*B29D 30/36* (2006.01)
*B29D 30/24* (2006.01)

(52) U.S. Cl.
CPC ........... *B29D 30/32* (2013.01); *B29D 30/245* (2013.01); *B29D 30/36* (2013.01); *B29D 2030/3214* (2013.01)

(58) Field of Classification Search
CPC .................. B29D 30/245; B29D 2030/3214
See application file for complete search history.

(56) References Cited

U.S. PATENT DOCUMENTS 1,674,249 A    6/1928  Johnson
2,469,633 A    5/1949  Corson
3,433,695 A *  3/1969  Giletta ................ B29D 30/245
                                                    156/401
4,144,114 A    3/1979  Enders
4,325,764 A *  4/1982  Appleby ................ B29D 30/36
                                                    156/123

(Continued)

FOREIGN PATENT DOCUMENTS

EP    1818165 B1    3/2014
EP    2078955 B1    7/2016

(Continued)

OTHER PUBLICATIONS

Valve Sizing Technical Bulletin (MS-06-84-E, R3), Jul. 2002, Swagelok (Year: 2002).*

(Continued)

*Primary Examiner* — Robert C Dye
*Assistant Examiner* — Alexander D Booth
(74) *Attorney, Agent, or Firm* — June E. Rickey

(57) ABSTRACT

A method of building a tire carcass is disclosed. The method of building the tire carcass includes the steps of applying one or more tire building components onto a drum forming a cylindrically shaped tire carcass. Placing a first and second bead onto the tire building components on the drum so that the tire carcass ends of the tire carcass extend laterally between the beads. Radially expanding a first and second bead lock mechanism into engagement with a respective first and second bead. Inflating the carcass under low pressure into engagement with a belt and tread package while moving the beads axially inward. Moving the beads axially inward to the axial width of the widest breaker position; Turning up the outer lateral ends of the cylindrically shaped tire carcass about a respective first and second bead.

10 Claims, 16 Drawing Sheets

(56) References Cited

U.S. PATENT DOCUMENTS

| | | | |
|---|---|---|---|
| 4,343,671 A * | 8/1982 | Enders | B29D 30/32 |
| | | | 156/401 |
| 4,998,092 A | 3/1991 | Ohno et al. | |
| 5,030,079 A | 7/1991 | Benzing, II | |
| 5,246,515 A | 9/1993 | Roedseth et al. | |
| 5,354,405 A | 10/1994 | Byerley | |
| 5,385,620 A | 1/1995 | Sato et al. | |
| 6,012,500 A | 1/2000 | Connor | |
| 6,372,070 B1 | 4/2002 | Iizuka et al. | |
| 7,101,451 B2 | 9/2006 | Zemla et al. | |
| 7,288,160 B2 | 10/2007 | Roedseth et al. | |
| 7,575,652 B2 | 8/2009 | Suda et al. | |
| 7,758,714 B2 | 7/2010 | Mizota | |
| 8,305,436 B2 | 11/2012 | Fujisawa et al. | |
| 8,402,801 B2 | 3/2013 | Ogawa | |
| 8,649,181 B2 | 2/2014 | Yamaguchi | |
| 8,820,375 B2 | 9/2014 | Cerny | |
| 9,283,723 B2 | 3/2016 | Dickerson et al. | |
| 9,333,719 B2 | 5/2016 | Kouno et al. | |
| 9,421,724 B2 | 8/2016 | Fougeras et al. | |
| 9,427,925 B2 | 8/2016 | Araki | |
| 2003/0168144 A1 | 9/2003 | Weaver et al. | |
| 2004/0013754 A1 | 1/2004 | Hirai et al. | |
| 2004/0123937 A1 | 7/2004 | Losey | |
| 2005/0028920 A1 | 2/2005 | Roedseth et al. | |
| 2006/0027310 A1 | 2/2006 | Auclair | |
| 2007/0137757 A1 | 6/2007 | Roman | |
| 2007/0199661 A1 | 8/2007 | Nicolas et al. | |
| 2008/0011409 A1 | 1/2008 | Ogawa | |
| 2008/0251185 A1 | 10/2008 | Cappa et al. | |
| 2014/0144566 A1 | 5/2014 | Miyazaki | |
| 2014/0360672 A1 | 12/2014 | Marcus, Jr. et al. | |
| 2015/0059962 A1 * | 3/2015 | Stoila | B29D 30/245 |
| | | | 156/131 |
| 2015/0059984 A1 | 3/2015 | Stoila et al. | |
| 2015/0114571 A1 | 4/2015 | Weaver et al. | |
| 2015/0165707 A1 | 6/2015 | Meyer | |
| 2015/0360398 A1 | 12/2015 | Monnereau et al. | |
| 2016/0176138 A1 | 6/2016 | Roa Guzman | |
| 2016/0332401 A1 * | 11/2016 | Nagai | B29D 30/0601 |
| 2019/0070811 A1 | 3/2019 | Stoila et al. | |
| 2019/0070812 A1 | 3/2019 | Stoila et al. | |
| 2019/0070813 A1 | 3/2019 | Stoila et al. | |
| 2019/0070814 A1 | 3/2019 | Stoila et al. | |
| 2019/0070815 A1 | 3/2019 | Stoila et al. | |
| 2019/0070816 A1 | 3/2019 | Stoila et al. | |

FOREIGN PATENT DOCUMENTS

| | | | |
|---|---|---|---|
| JP | 2002337249 A * | 11/2002 | |
| KR | 20110072853 A | 6/2011 | |
| WO | WO2009130727 A1 | 10/2009 | |
| WO | WO2013022825 A3 | 4/2013 | |

OTHER PUBLICATIONS

ESpaceNet Translation of JP2002337249A (Year: 2020).*
European Search Report for Serial No. 18191780.8 dated Feb. 4, 2019.
Yang Shungen, Rubber Machinery, Rubber Industry Manual, Nov. 30, 1992, pp. 641 and 642, vol. 1, Chemical Industry Press.
Translation of Chinese Search Report Serial No. 201811011901.5 dated Apr. 23, 2020.
Translation of Chinese Search Report Serial No. 201811011290.4 dated May 7, 2020.

* cited by examiner

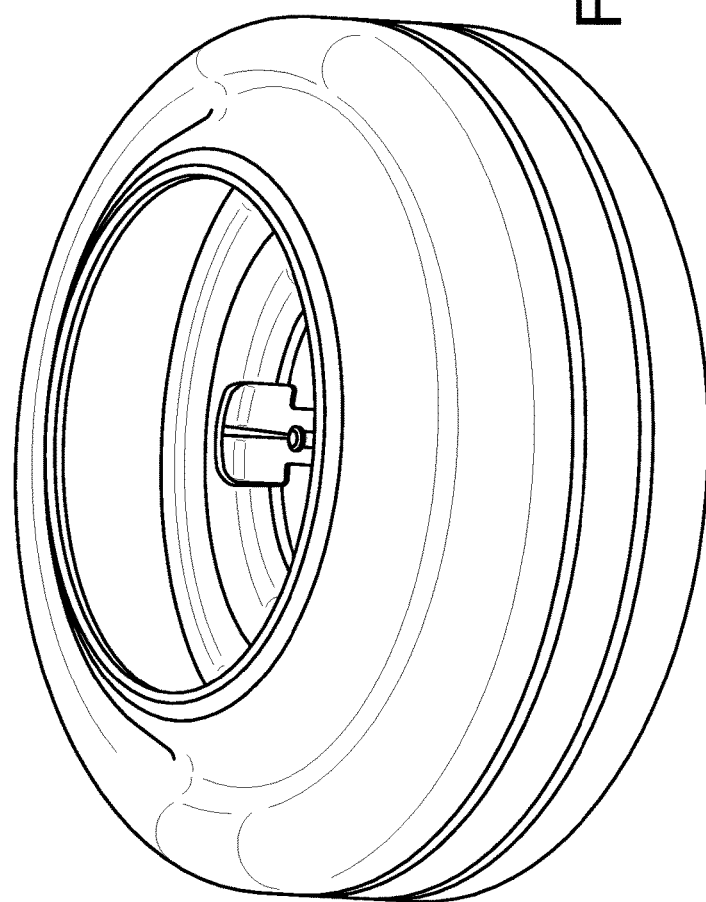
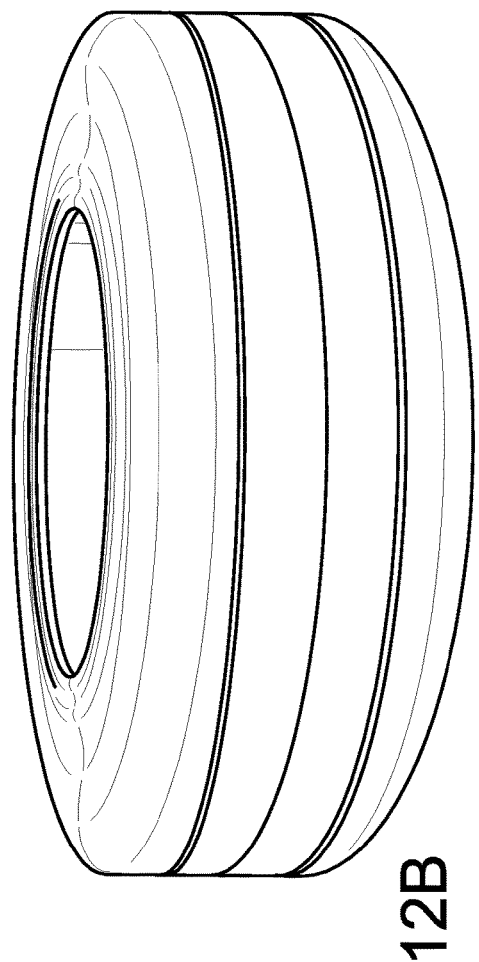
FIGURE 12A
FIGURE 12B

|  | CONTROL | INFLATED TURN UP |
|---|---|---|
| RR | = | = |
| TIRE STIFFNESS | = | =/+ |
| FOOTPRINT LENGTH | = | + |
| FOOTPRINT SHAPE FACTOR | = | + |
| SUBJECT HANDLING | = | ++ |
| SUBJECT RIDE | = | = |
| LONG TERM FLATSPOT | = | + |

FIGURE 15

|                            | CONTROL | INFLATED TURN UP | %DELTA |
|----------------------------|---------|------------------|--------|
| RRc                        | 7.83    | 7.7              | 2%     |
| VERTICAL SPRINGRATE (lb/in)| 2188    | 2293             | 4.8%   |
| LONGIT. SPRINGRATE (lb/in) | 2246    | 1402             | 11.6%  |
| LATERAL SPRINGRATE (lb/in) | 1303    | 2506             | 7.6%   |
| FOOTPRINT LENGTH           | 6.0     | 6.21             | --     |
| FOOTPRINT SHAPE FACTOR     | 1.06    | 1.12             | --     |
2243 [lbs] LOAD
56 [psi] INFLATION
0 [deg] CAMBER
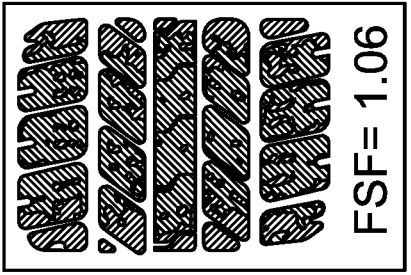
Control
FSF= 1.06
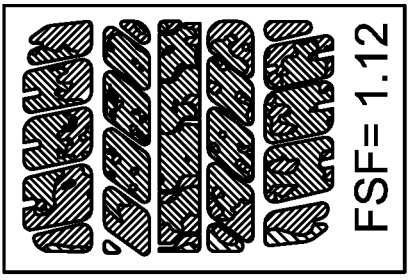
Inflated Turnup
FSF= 1.12
FIGURE 16

METHOD OF MAKING A TIRE

FIELD OF THE INVENTION

The invention relates to a method of building tires.

BACKGROUND OF THE INVENTION

The manufacture of tires typically involves a tire building drum wherein numerous tire components are applied to the drum in sequence, forming a cylindrical shaped tire carcass. The tire building drum may be a flat drum, unistage drum, a first stage drum or a high crown tire building drum. In either case, tire components are added onto the drum in succession in order to form a cylindrically shaped first stage green carcass. Next a shaping operation is performed to transform the cylindrical green carcass into a toroidally shaped green tire. Inherent stresses are often created in the green tire, particularly in the apex, bead area and sidewall due to the compression forces and compound strain applied to the carcass in order to transform the components into the desired toroidal shape. These inherent residual stresses can cause tire non-uniformity, poor handling and lower rolling resistance. Thus, an improved tire building process is thus desired that minimizes the residual tire building stresses resulting in an improved tire is desired.

SUMMARY OF THE INVENTION

The invention provides in a first aspect a method of building a tire carcass on a tire building drum. The method of includes the steps of applying one or more tire building components onto a drum forming a carcass; placing a first and second bead onto the carcass so that the lateral ends of the tire carcass extend axially outward of the beads; radially expanding a first and second bead lock mechanism into engagement with a respective first and second bead; inflating the carcass under low pressure into engagement with a belt and tread package while moving the beads axially inward; continuing to move the beads axially inward and then turning up the outer lateral ends of the cylindrically shaped tire carcass about a respective first and second bead.

The invention provides in a second aspect a method of building a tire carcass on a tire building drum comprising the steps of: applying one or more tire building components onto a drum forming a tire carcass; applying a first and second wedge component onto the tire carcass; placing a first and second bead onto the tire carcass on the drum so that the tire carcass ends extend laterally outward of the beads, inflating the carcass under low pressure and expanding the carcass into engagement with tread and belt assembly; moving the bead locks axially inward to the widest breaker axial width; turning up the outer lateral ends of the cylindrically shaped tire carcass about a respective first and second bead and apex subassembly while the carcass remains inflated.

Definitions

For ease of understanding this disclosure, the following items are defined:

"Apex" means an elastomeric filler located radially above the bead and interposed between the plies and the ply turn-up.

"Axial" and "axially" means the lines or directions that are parallel or aligned with the longitudinal axis of rotation of the tire building drum.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt Structure" or "Reinforcing Belts" means at least one annular layer or plies of parallel cords, woven or unwoven, underlying the tread and unanchored to the bead.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire building drum.

"Radial Ply Tire" means a belted or circumferentially restricted pneumatic tire in which at least one layer of ply has the ply cords extend from bead to bead at cord angles between 65° and 90° with respect to the equatorial plane of the tire.

"Shoulder" means the upper portion of sidewall just below the tread edge.

"Sidewall" means that portion of a tire between the tread and the bead.

"Tread" means a rubber component which when bonded to a tire carcass includes that portion of the tire that comes into contact with the road when the tire is normally inflated and under normal load.

"Tread Width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which:

FIG. 12A illustrates a prior art green tire showing the apex in an undesirable position, while FIG. 12B illustrates a green tire formed by the catenary process that is in the relaxed horizontal shape.

FIG. 14A illustrates a control tire section while FIG. 14B illustrates the catenary tire section, with close up views of the bead areas.

FIG. 15 illustrates the control tire vs the catenary tire differences.

FIG. 16 illustrates the control tire vs the catenary tire lab results for spring rate, footprint length and footprint shape factor.

DETAILED DESCRIPTION OF THE INVENTION

Figure 1:
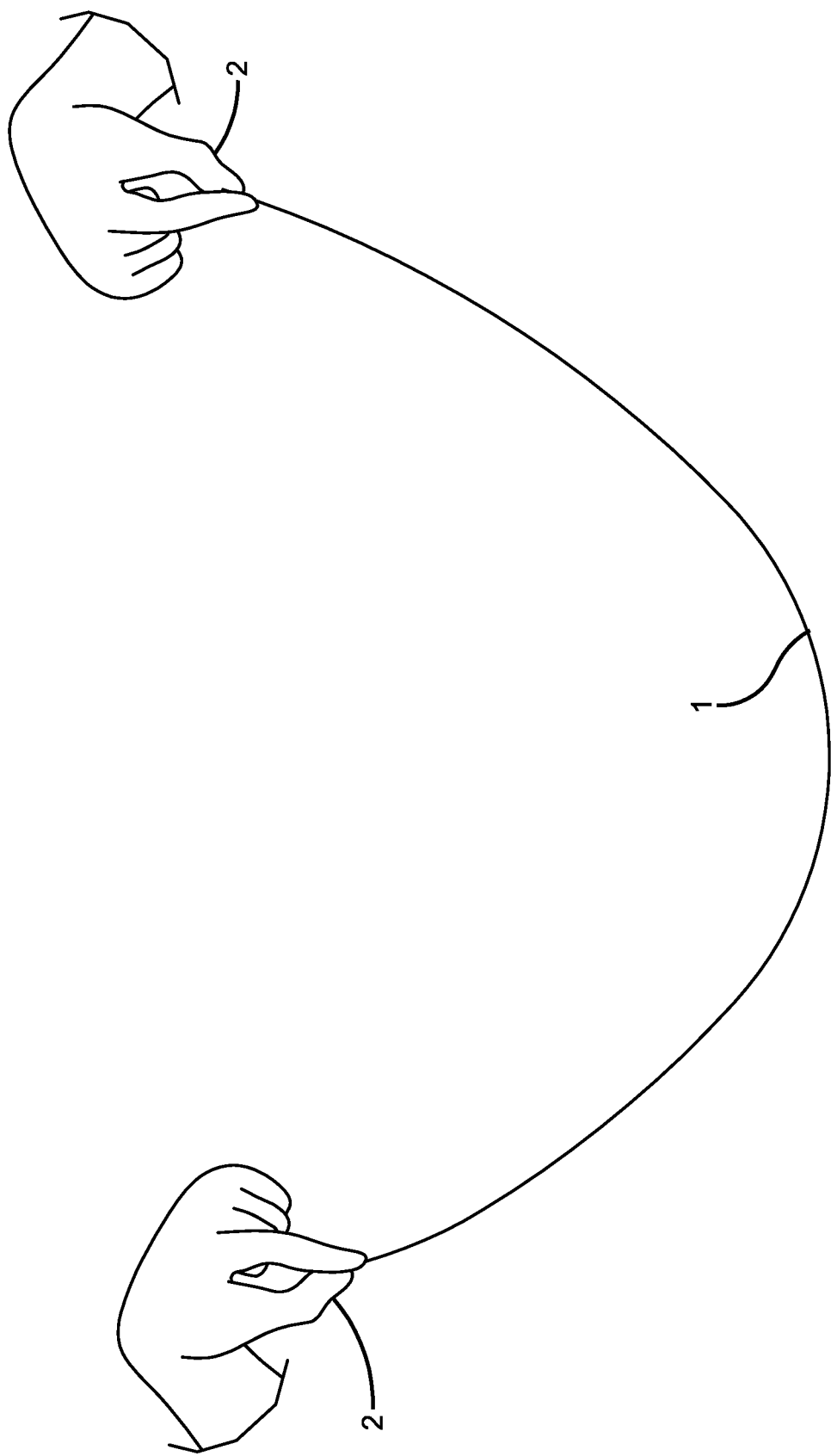
FIG. 1 is a sketch of a catenary curve of a chain held by two hands.

The invention provides a new and improved tire building process that reduces the residual stresses in the green tire carcass, resulting in an improved tire. The process provides that the tire ply and components are shaped into a catenary structure. A catenary structure is a structure that has no tensile or compressive reactions at the base of the structure, and has uniform strain along the length of the structure. An exemplary catenary structure is shown in FIG. 1, wherein the ends 2 of the structure are held forming a structure 1 that has uniform strain along its length. In the case of a tire, the beads are the base of the structure and the length from the bead to the crown has uniform strain.

The catenary method of building tires of the present invention produces a tire that has a bead area and sidewall made with minimal strain. The catenary method produces ply cords that have the shortest cord length that are maintained in tension, and not compression. The catenary method of building tires also prevents ply cord trisomy, or the unraveling of the cords due to the cords being loaded in compression and not tension. A key to the catenary method of tire construction is to maintain the body ply cords in tension and of two distinct regions while shaping the tire.

Figure 2:
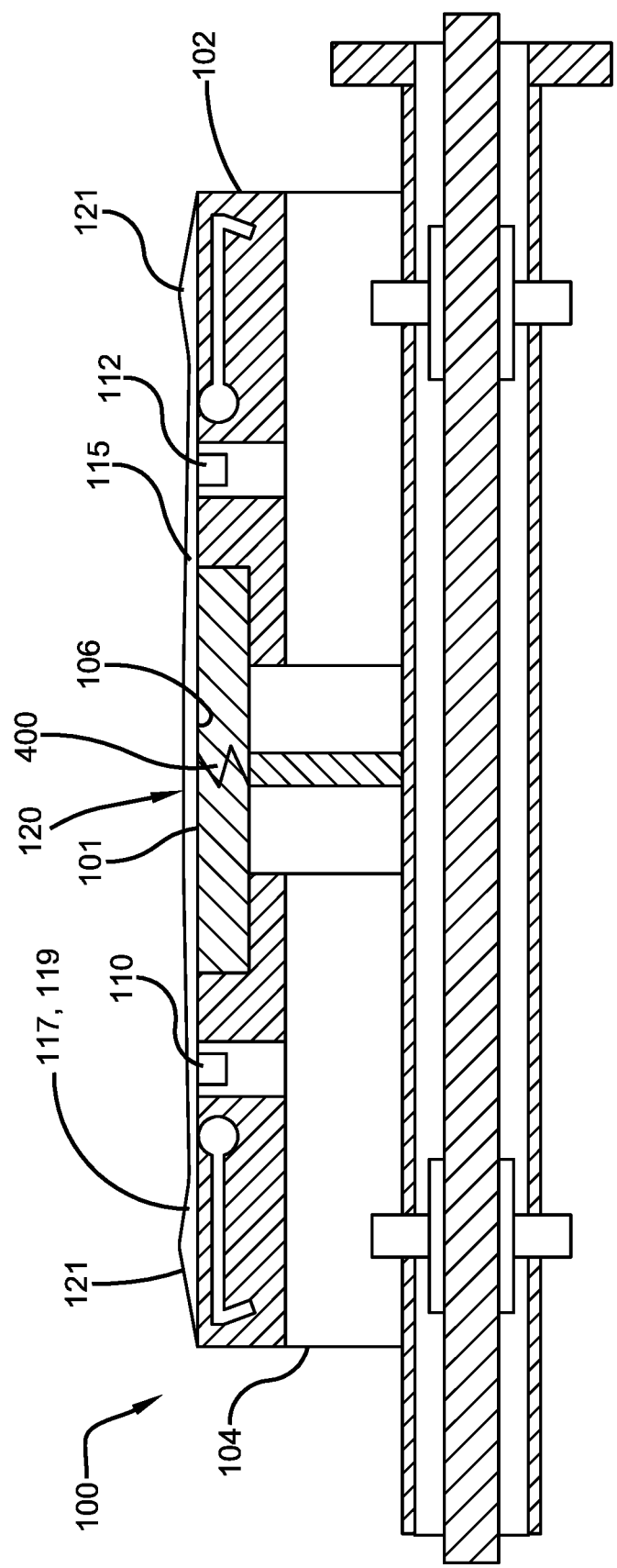
FIG. 2 is a side cross-sectional view of a tire building drum shown in the start position.
Figure 6:
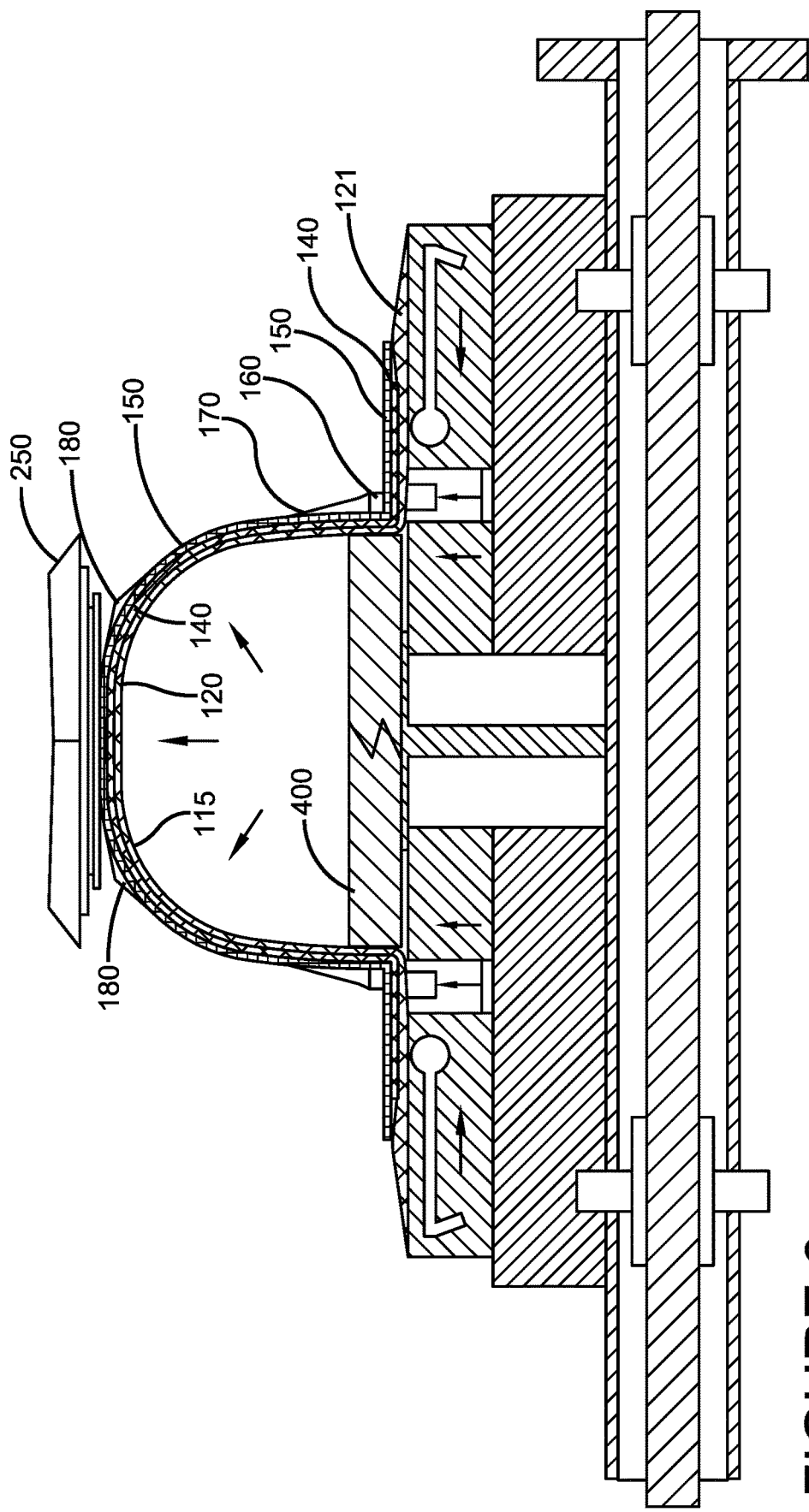
FIG. 6 is a side cross sectional view of the tire building drum showing the carcass undergoing low pressure, high volume shaping before the tread and belt package is applied.

A first embodiment of a method of producing a tire of the present invention is accomplished by the following steps. FIG. 2 illustrates a schematic of a tire building drum 100 suitable for use in practicing the invention. The invention is not limited to the tire building drum apparatus as shown, and may be practiced with other types of tire building drums such as non-crowning drums, unistage drums or two stage drums. The tire building drum has 100 may optionally include a right section 102, a left section 104 and a center section 106. The center section 106 preferably includes a radially expandable crowning portion 400 capable of axially expanding or contracting as desired. The tire building drum 100 further comprises a left bead lock mechanism 110 and a right bead lock mechanism 112 capable of radially expanding to apply a low-pressure bead locking force. Preferably the bead lock cylinder pressures are less than 5 bar, and more preferably less than 4.5 bar, and most preferably less than 4 bar. The low-pressure bead lock mechanisms allow the bead to pull firmly to the crowning backstop 400 when the carcass is shaping to the neutral shape and approaching contact with the belt and tread package as shown in FIG. 6. The bead pressure is reduced to limit bead compression and prevent cold forging of the toe guard and chafer under the bead sole.

The tire building drum 100 further includes a smooth outer cylindrical surface 101 for the application of one or more tire components. Preferably, the outer drum surface has vacuum holes for suction force to retain the tire components on the drum during the tire building process.

Figure 10:
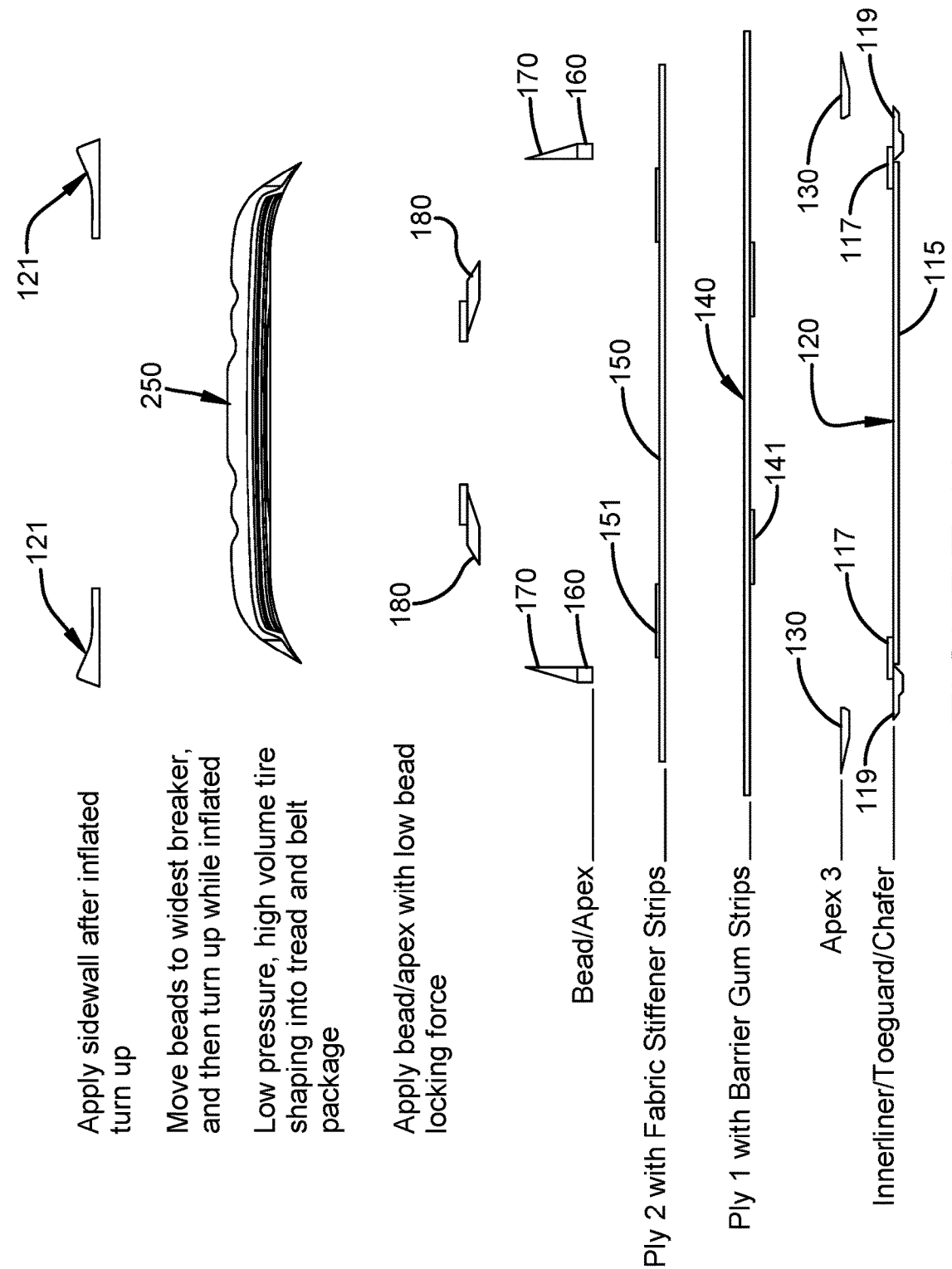
FIG. 10 illustrates the order of components applied to the tire building drum prior to shaping.
Figure 11:
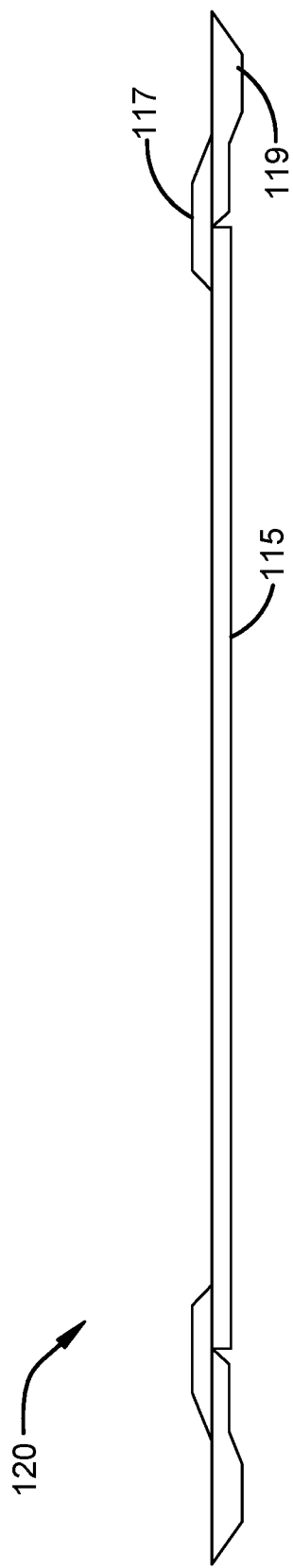
FIG. 11 illustrates the preassembled layer of the innerliner, toeguard, and chafer.

The first step of the catenary method of building tires begins with the tire building drum located in the flat (no crown) position as shown in FIG. 2. Next, a first layer 120 of tire components is applied to the outer drum surface. As shown in FIGS. 10 and 11, the first layer 120 includes an inner liner 115, with a toeguard 117 and chafer 119 applied to the radially outer ends of the inner liner. The first layer 120 may optionally include a layer of sidewall 121 to the radially outer ends of the first layer 120. An optional apex 3 130 may be positioned over the first layer.

Figure 3:
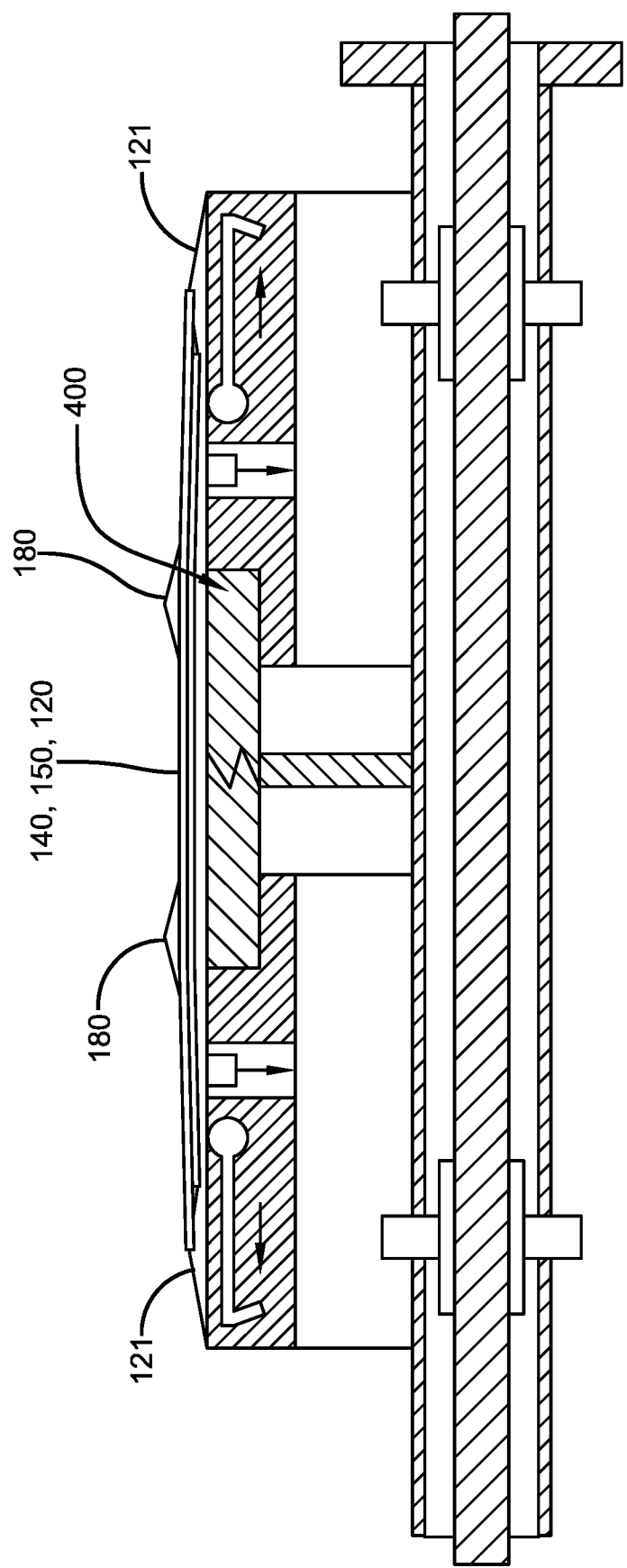
FIG. 3 is a side cross-sectional view of the tire building drum of FIG. 2 shown with additional tire building components such as the ply and wedge.
Figure 4:
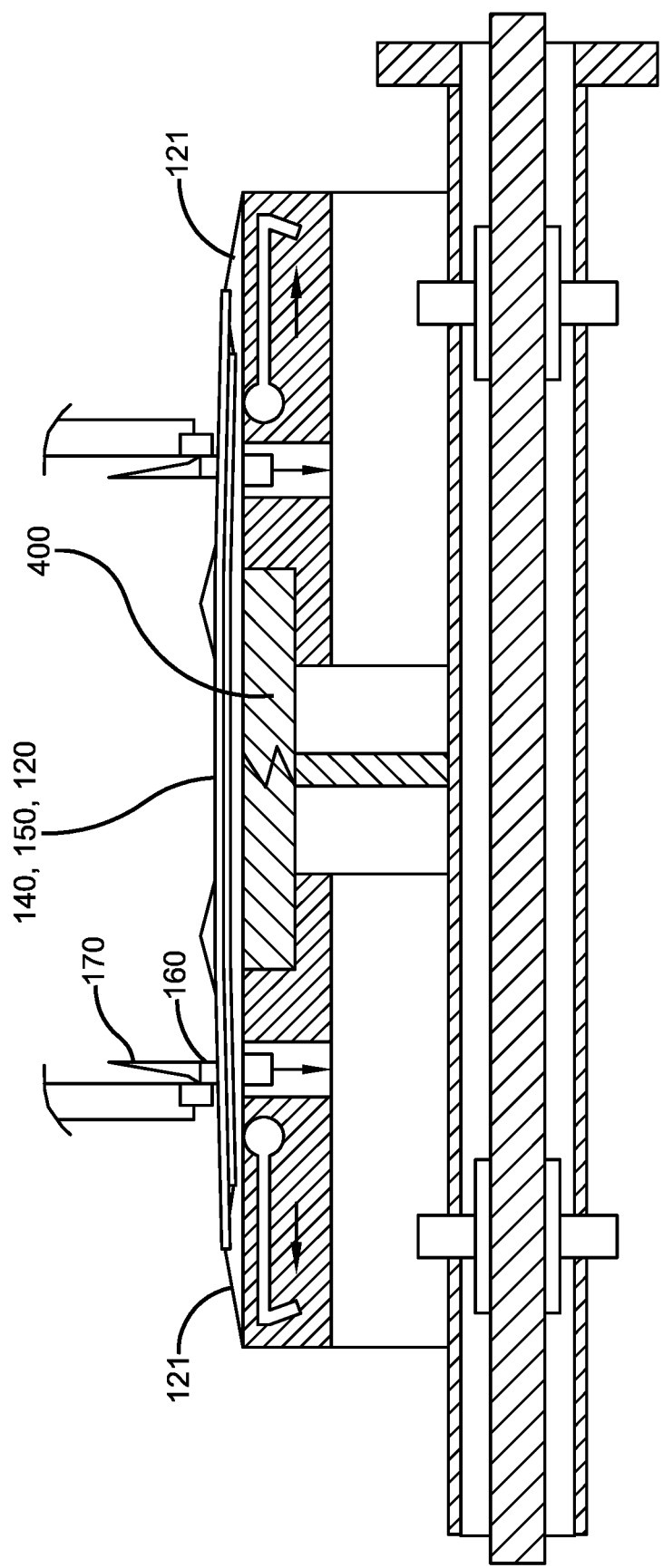
FIG. 4 is a side cross-sectional view of the tire building drum shown with an apex and bead being applied to the drum.
Figure 5:
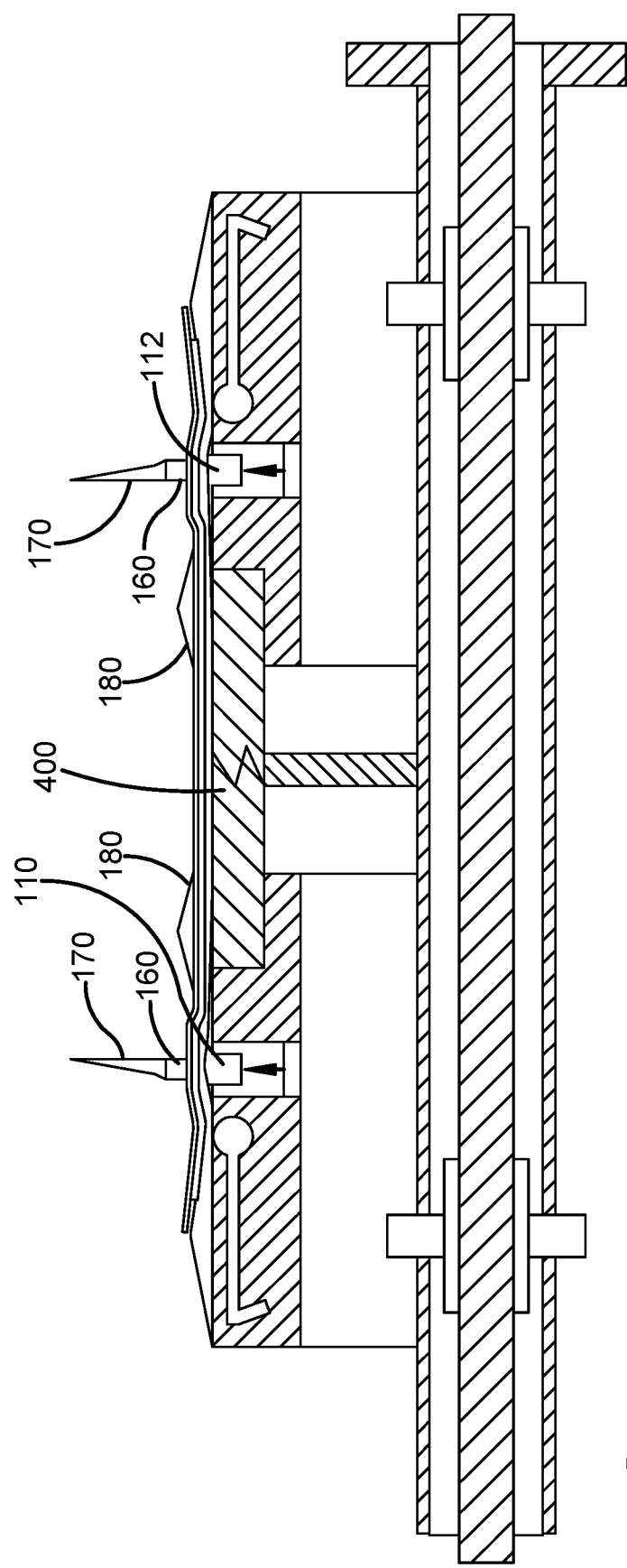
FIG. 5 is a side cross sectional view of the tire building drum showing the beads in the locked position by the bead clamps.

As shown in FIG. 3, a first and optional second layer of ply 140,150 may be applied. Next, a first and second wedge component 180 is positioned over the one or more layers of ply in the shoulder region of the carcass structure. Alternatively, the wedge components 180 could be pre-assembled to the belt breaker (not shown). Next, the beads 160 and apex 170 are applied as shown in FIG. 4 so that the apex is mounted radially outward of the ply or in the direction of the cured ply line angle. Preferably, the bead ring and apex are assembled together to form a subassembly. The apex 170 is preferably triangular in cross-section and positioned on the drum such that the apex tip stands radially outward or in the direction of the cured ply line angle. As shown in FIG. 5, the drum bead locks 110,112 are radially expanded to exert a low-pressure force on the beads 160 sufficient to retain the bead in their axial position.

Figure 7:
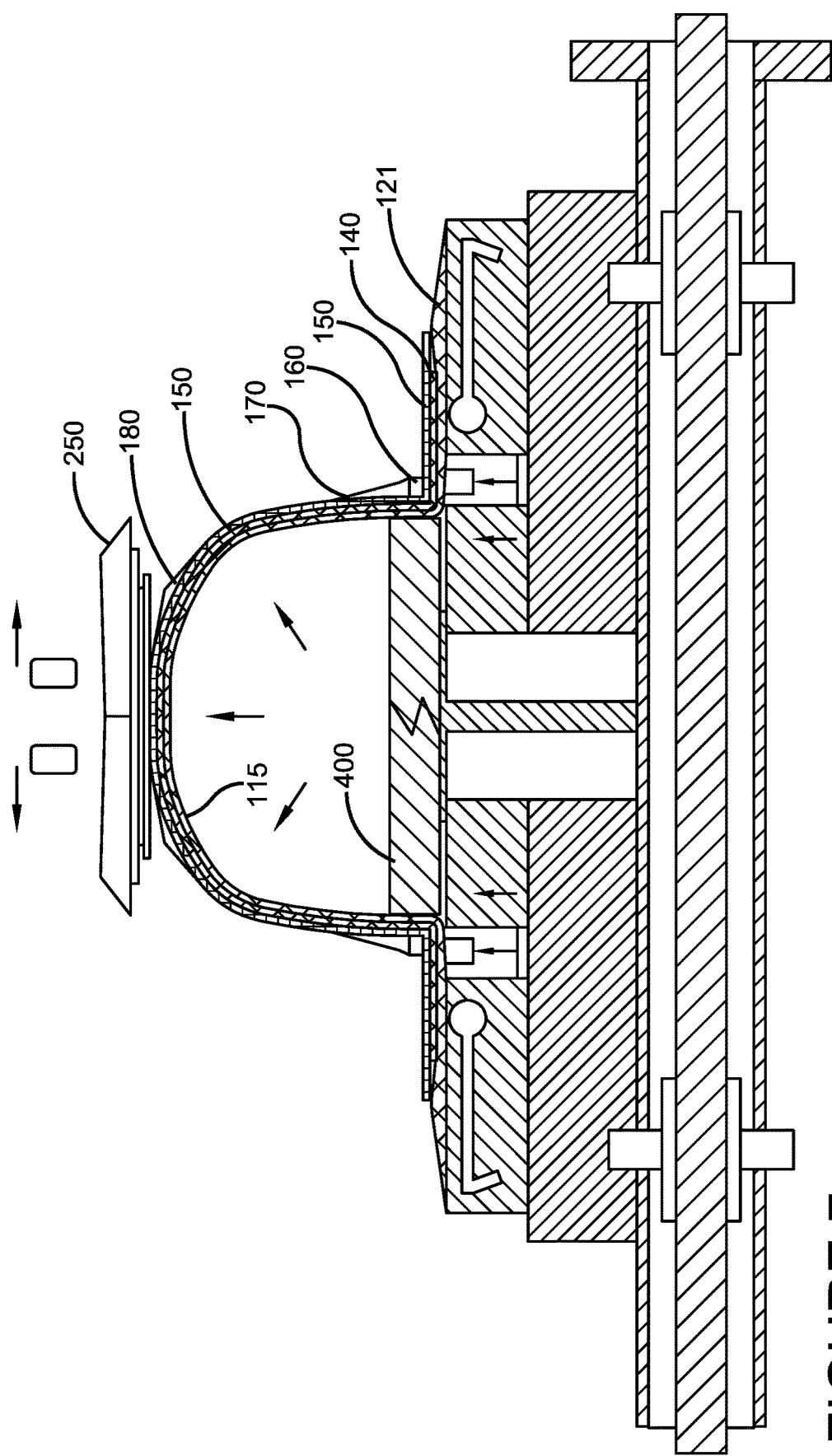
FIG. 7 is a side cross sectional view of the tire building drum showing the carcass undergoing shaping into the tread and belt package.

The next step is to shape the green carcass using the catenary shaping process. The transfer ring with the assembled belt and tread package 250 is positioned over the carcass as shown in FIG. 6. Next, the bead locks are moved axially inward at least 10 mm to 50 mm to release the tension on the ply cords before the carcass inflation is initiated. The carcass is inflated using high volume, low pressure air before the turnup has occurred, as shown in FIGS. 6-7. The carcass expands into the assembled belt and tread package 250 as shown in FIG. 7. As the sidewall angle increases from 5 degrees to about 65 degrees, the force vectors created by the shaping air pull the beads axially inward. If a high crown drum is used, the central high crown drum 400 is actuated radially outward to assist in the shaping of the tire by acting as a back stop to hold the beads in place and prevent axial movement. As the tire inflates the tire shapes itself into a catenary structure, i.e., there are no forces pulling the beads in or pushing the beads out. The air inflation pressure preferably does not exceed 280 mbar, and is preferably in the range of 210-280 mbar. The flow rate is increased from prior art process so that the flow coefficient Cv rate is about 10.

During inflation, the bead locks are slowly moved axially inward. The rate of axial movement of the bead locks towards each other is preferably in the range of 5-15 mm/s, more preferably 8-10 mm/s. Next, the tread and shoulder area is stitched to the carcass using low stitching pressure (not shown). The stitching pressure is in the range of 350 to 800 mbars, more preferably in the range of 500-700 mbars. The stitcher, using low pressure, starts at the center of the tread and stitches the tread in a circumferential manner, shifting axially outward from the center of the tire. The stitcher also stitches the tread shoulder interface and shoulder area.

Figure 8:
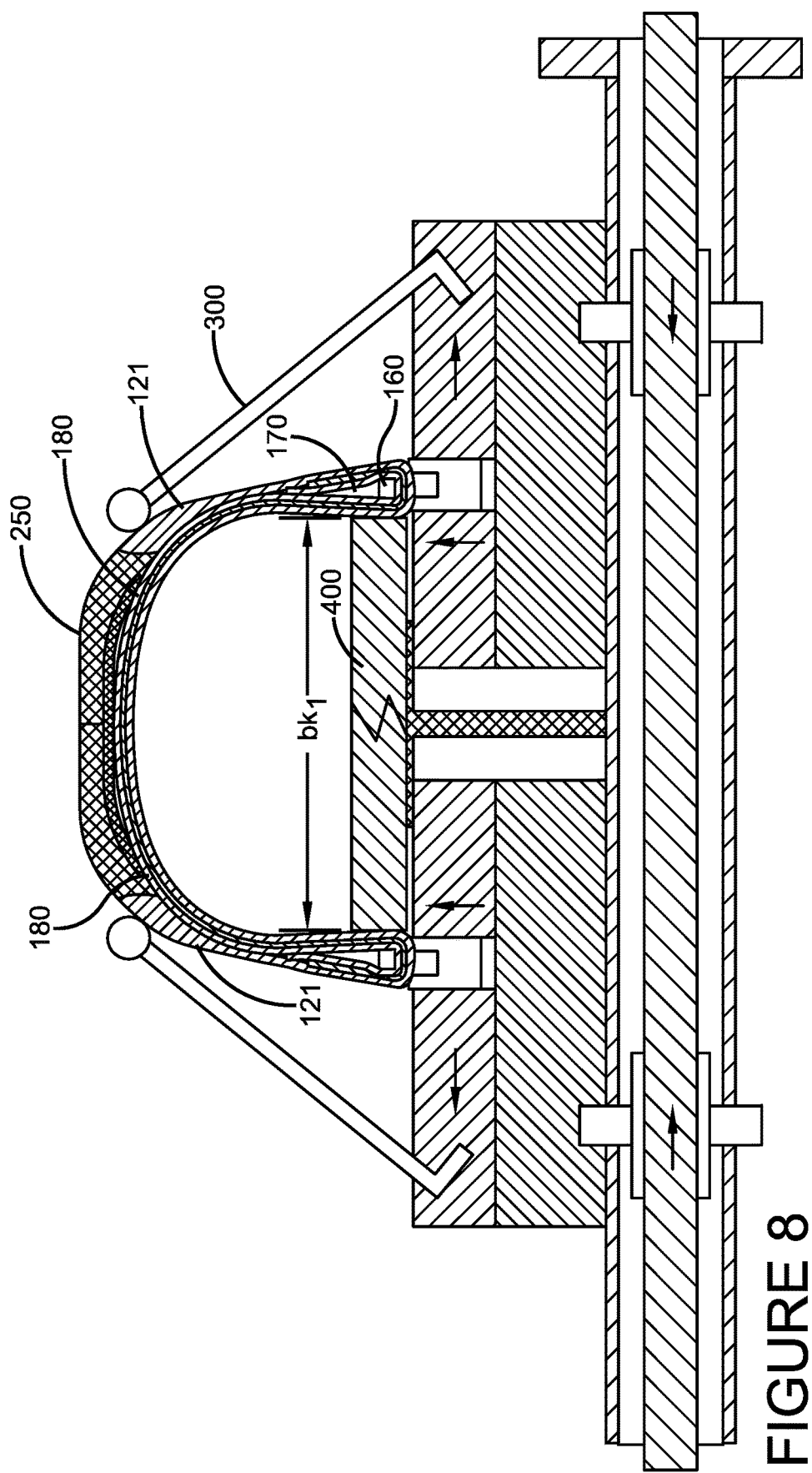
FIG. 8 is a side cross sectional view of the tire building drum showing the inflated turnup of the sidewall over the tread.
Figure 9:
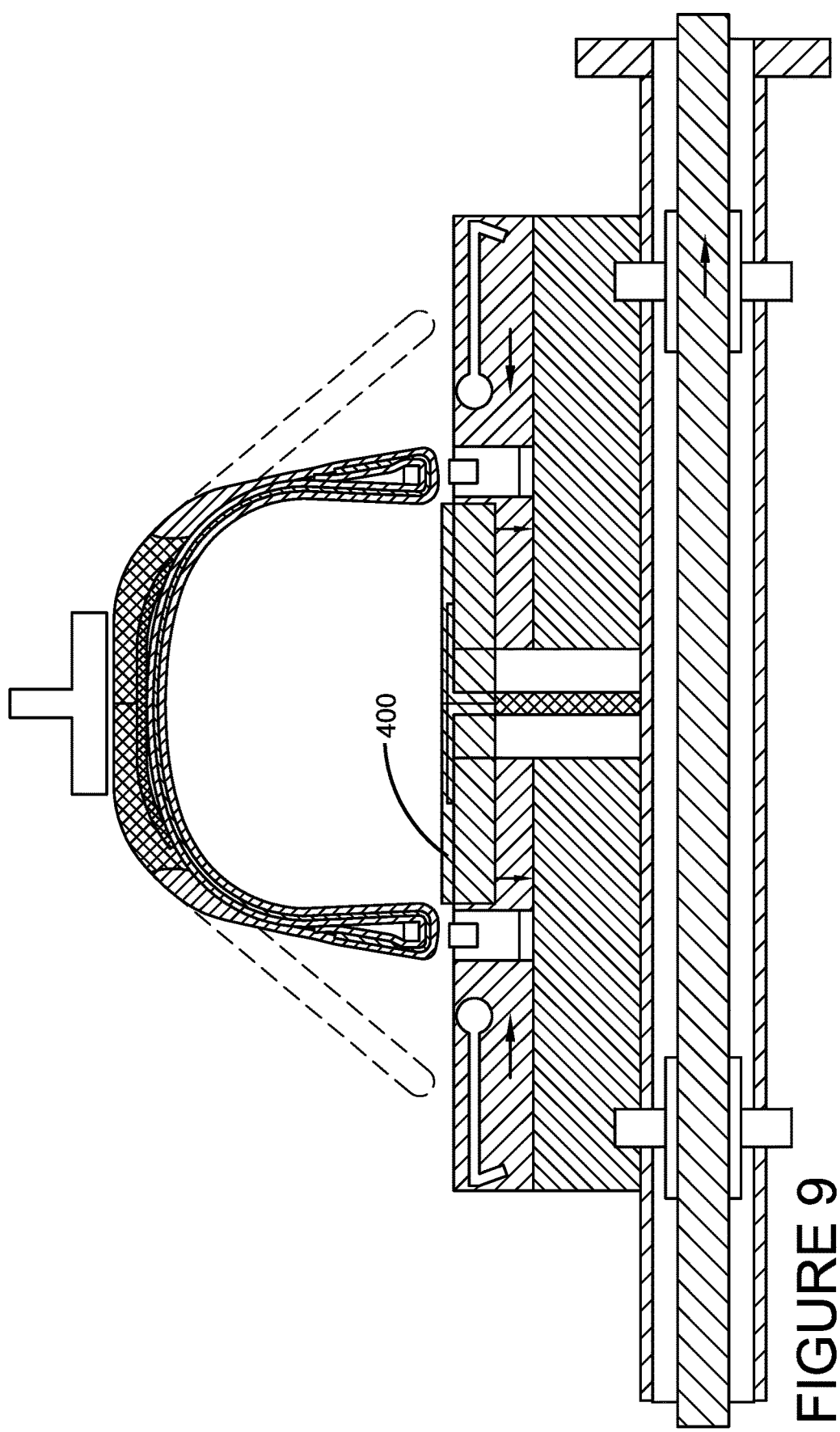
FIG. 9 illustrates removal of the green tire from the tire building drum, with the prior art green tire shape shown in phantom.

Next, the axial width is decreased, and is preferably adjusted to be about the widest breaker belt BK1. It is preferred in this embodiment that a crowning drum be used. Next, the sidewalls are turned up using mechanical drum shaping levers 300 as shown in FIG. 8 or using shaping bladders (not shown) while the carcass is still inflated. Then the tire is removed from the tire building drum as shown in FIG. 9, completing the process. The green tire is then cured in a conventional mold.

Figure 14:
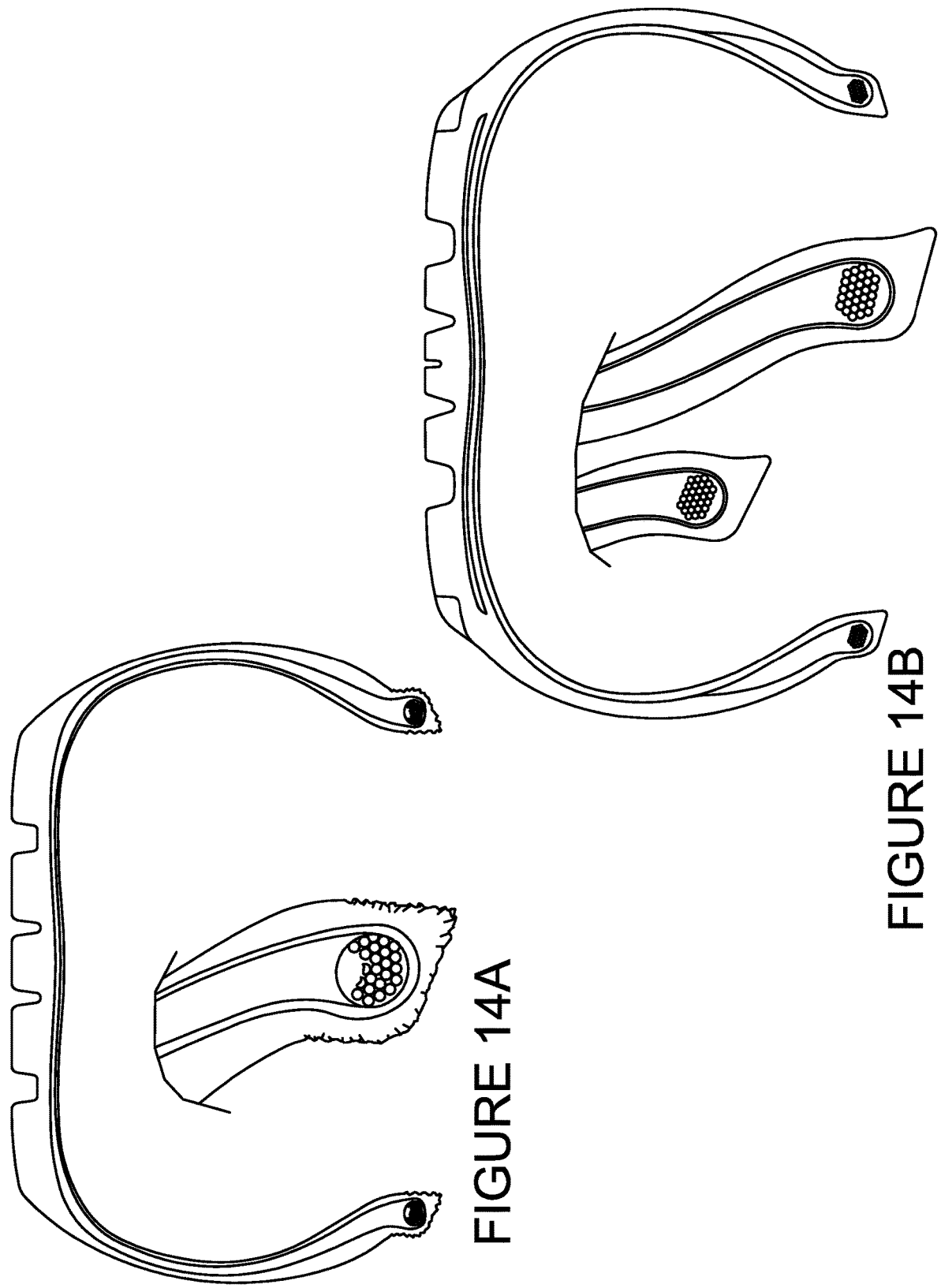

The advantage of the catenary shaping process is that it does not produce any "ply pull around" which results in the distortion of the bead bundle shape. FIG. 12A illustrates the prior art green tire formed prior to molding, with the apex component requiring 130 degrees of rotation to conform with mold shape. FIG. 12B illustrates the tire formed by the catenary process, wherein the apex requires 35 degrees of rotation to conform with the mold shape. See also FIG. 9, which shows the prior art shape of the finished tire in phantom. Thus, the control tire has a significantly higher residual strain as compared to the tire formed by the catenary process. See also FIG. 14A which shows a control tire section made by the prior art tire building process. The bead bundle is distorted in shape. See FIG. 14B which illustrates a tire section formed by the catenary process of the invention. As shown, the bead bundle is perfectly shaped with no distortions. When the ply is pulled around the bead due to the large forces during turnup or due to the curing pressure, one or more wires of the bead bundle may be knocked out of shape, resulting in the displaced wires becoming useless and the strength factor of the bead bundle is reduced. Ply cord pull around also contributes to loose body ply cord tension. The catenary process eliminates ply cord pull around by shaping the carcass in as close to the molded shape as possible before the tire sidewall and body ply is turned up, typically within 9% of the final molded dimensions. The catenary shaping process also results in reduced use of material, because less ply cord is needed.

FIG. 15 illustrates the advantages to a tire formed by the catenary process as compared to the control tire formed by the conventional process. The catenary process results in improved handling, stiffness, footprint length and shape factor. FIG. 16 illustrates the lab results of a control tire formed by the prior art tire building process as compared to a tire formed by the catenary process. The tire formed by the catenary process has increased vertical, lateral and longitudinal spring rate. The tire formed by the catenary process has a larger footprint with an increased length and shape factor.

Figure 13:
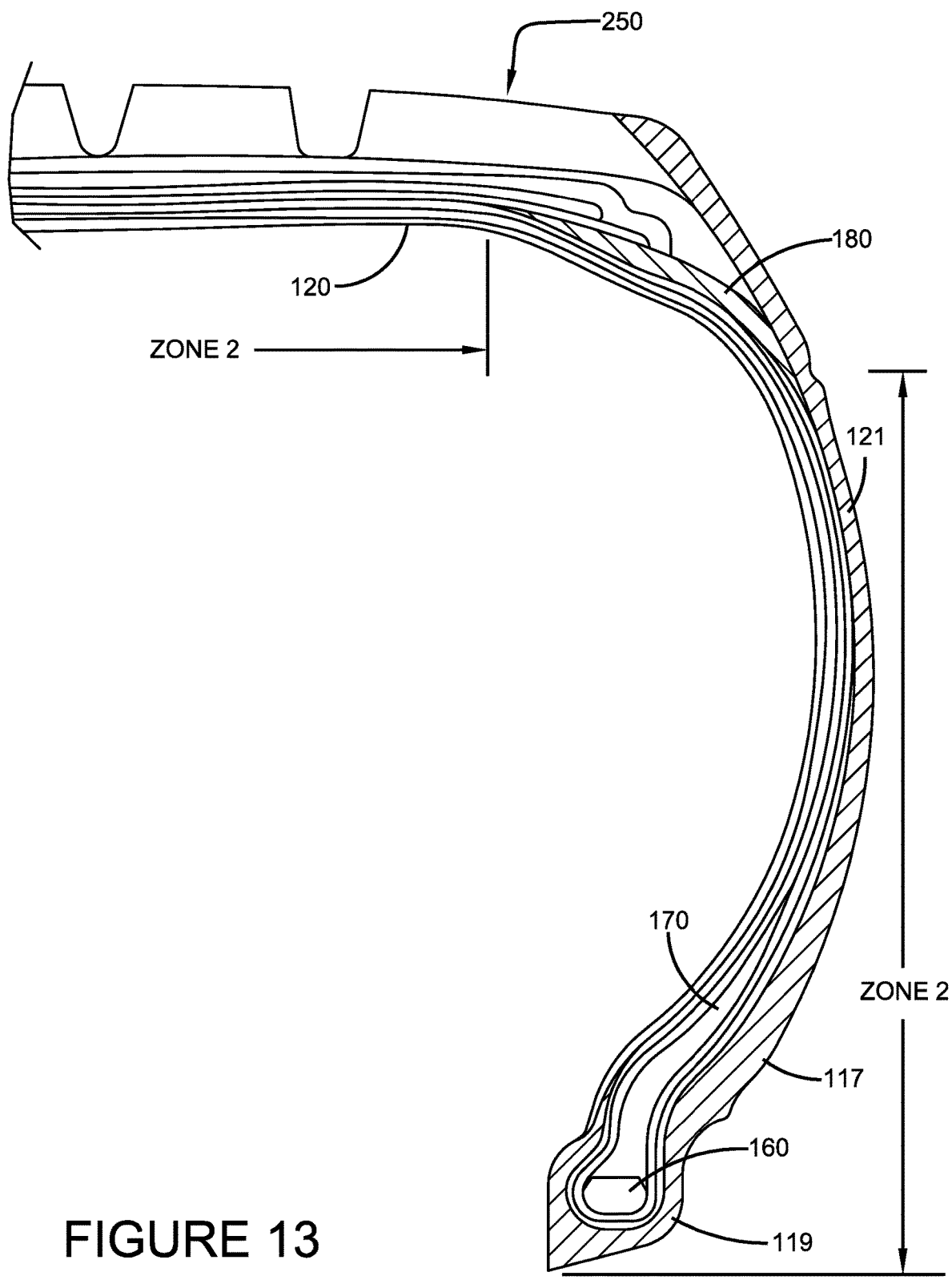
FIG. 13 illustrates a cross-sectional view of the tire formed by the catenary process.

The catenary method of building tires is enhanced by the use of a separate wedge component 180 that is located in each shoulder region of the tire, as shown in FIG. 13. Each wedge divides the ply into two zones. The first zone is located between the bead region and the wedge on each side of the tire. In the first zone, the ply cords and sidewall form a column like I beam structure that is in single bending. This shape approximates the shape of the mold sidewall contour. The second zone is formed axially between the wedges 180. In the second zone, the wedges create a tangential restriction band that constrains the tire cords in the crown area as the tire is shaped. In the second zone, the ply cords are horizontal and parallel to the underside of the belt and tread package to be added, and to the molded tread radius. The second zone acts as a broad flat patch to the underside of the belt and tread package. Creating and aligning parallel surfaces is of utmost importance when assembling the tire. The separate wedge component 180 also functions as a support for the belt ending. The wedge component functions as a broad flatter patch to the underside of a flat belt and tread package when compared to shaping a tire made with flat turn up.

The length and section thickness of the separate wedge 180 may be tuned to provide a desired strain rate for improved handling. The wedge enveloping the shoulder of the sidewall and extending down to the direction the bead then can influence and control the lateral stiffness and steering response of the tire. The wedge component modulus can be adjusted higher or lower for specific tire handling response. In addition, the handling of the tire may be tuned by varying the section height formed by the radial distance between the radially inner wedge ending and the turn up ply. This radial distance or section height of the sidewall and cords functions as an I beam. The I beam is defined by the turn down ply, the gauge of wedge, and the turn up ply. The wedge may also be embodied in the turnup ply and act as a low wedge parallel to the apex and connected to the middle wedge region.

FIG. 10 illustrates an alternate embodiment of the method for building a tire using the catenary process. All of the steps previously described are the same, except for the following differences. In this embodiment, the sidewalls are not applied in the first stage. Instead the sidewalls are applied to the green carcass after the ply has been turned up and after the tread has been applied to the toroidally shaped green carcass. The sidewalls may be applied by strip lamination using an extruder gear pump arrangement, or by the application of a prefabbed sidewall component. In addition, the first layer of ply 140 may also include barrier gum strips 141, and the second layer of ply 150 may include fabric stiffener strips 151.

While certain representative embodiments and details have been shown for the purpose of illustrating the invention, it will be apparent to those skilled in this art that various changes and modifications may be made therein without departing from the spirit or scope of the invention.

What is claimed is:

1. A method of building a tire carcass on a tire building drum comprising the steps of:
    applying one or more tire building components onto a drum forming a carcass;
    placing a first and second bead onto the carcass so that the lateral ends of the tire carcass extend axially outward of the beads;
    radially expanding a first and second bead lock mechanism into engagement with a respective first and second bead;
    inflating the carcass into engagement with a belt and tread package using air having an inflation pressure less than 280 mbar while moving the beads axially inward, and
    continuing to move the beads axially inward and then turning up the outer lateral ends of the cylindrically shaped tire carcass about a respective first and second bead.

2. The method of claim 1 further comprising the steps of applying a first and second wedge component to the cylindrically shaped tire carcass.

3. The method of claim 1 further comprising the steps of applying a first and second sidewall after the lateral ends of the tire carcass are turned up.

4. The method of claim 1 wherein the carcass is inflated with airflow having a flow coefficient Cv of 2 or more, wherein the flow coefficient Cv is measured across a valve.

5. The method of claim 1 wherein the carcass is inflated with airflow having a flow coefficient Cv of 5 to 10, wherein the flow coefficient Cv is measured across a valve.

6. The method of claim 1 wherein the beads are moved axially inward to the axial width of the widest breaker of the belt and tread package before the turnup step.

7. The method of claim 1 further including the step of radially expanding a center portion of the tire building drum.

8. The method of claim 1 wherein each bead lock mechanism has a respective bead lock cylinder, wherein the bead lock cylinder pressure is less than 5 mbar.

9. A method of building a tire carcass on a tire building drum comprising the steps of:

applying one or more tire building components onto a drum forming a tire carcass;

applying a first and second wedge component onto the tire carcass;

placing a first and second bead onto the tire carcass on the drum so that the tire carcass ends extend laterally outward of the beads, inflating and expanding the carcass into engagement with a tread and belt assembly using air having an inflation pressure less than 280 mbar;

moving the bead locks axially inward to the widest breaker axial width; and turning up the outer lateral ends of the cylindrically shaped tire carcass about a respective first and second bead and apex subassembly while the carcass remains inflated.

10. The method of claim 9 further comprising the step of radially expanding a first and second bead lock mechanism into engagement with a first and second bead at less than 5 mbar.

* * * * *